W. H. Payne,
Harness Fastener,
No. 83,087. Patented Oct. 13, 1868.

Witnesses.
W. C. Ashkettle
Wm. A. Morgan

Inventor.
Wm. H. Payne
per Munn & Co.
Attorneys

UNITED STATES PATENT OFFICE.

WILLIAM H. PAYNE, OF JANESVILLE, WISCONSIN.

IMPROVED HAMES-FASTENER.

Specification forming part of Letters Patent No. 83,087, dated October 13, 1868.

*To all whom it may concern:*

Be it known that I, WILLIAM H. PAYNE, of Janesville, in the county of Rock and State of Wisconsin, have invented a new and Improved Hames-Fastener; and I do hereby declare that the following is a full, clear, and exact description thereof, which will enable those skilled in the art to make and use the same, reference being had to the accompanying drawings, forming part of this specification, in which—

Figure 1:
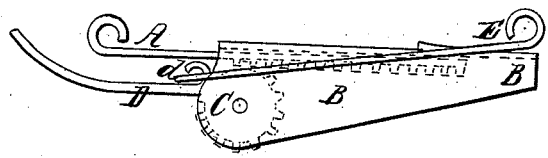
Figure 2:
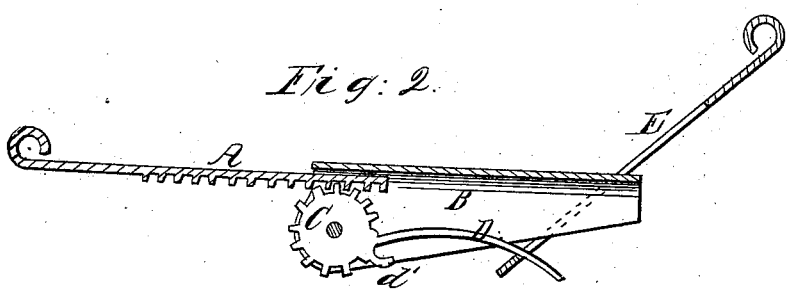
Figure 3:
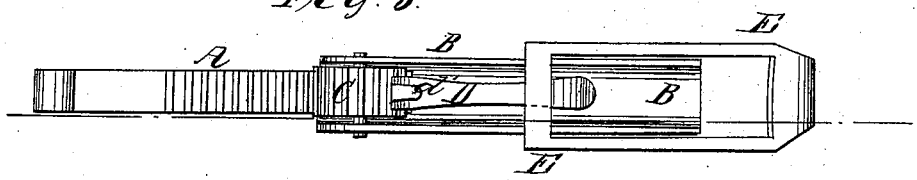

Figure 1 is a side view of my improved fastener in position to fasten hames. Fig. 2 is a side view of the same, one side of the cap being removed. Fig. 3 is an edge view of the same.

Similar letters of reference indicate corresponding parts.

My invention has for its object to furnish an improved hames-fastener, simple in construction, durable, easily attached and detached, and which will hold the hames securely fastened; and it consists in the construction and combination of the various parts, as hereinafter more fully described.

A is a bar, having an eye or closed hook formed upon one end, by means of which it is pivoted to the end of one of the hames. Upon one side of the bar A are formed cogs or teeth, as shown in the drawings.

B is a plate, the sides of which are turned up, as shown in the drawings, so as to form a cap, the plate being cut out into such a form that the cap may be tapering or deeper at one end than at the other.

C is a cog or gear wheel, pivoted in the deeper part of the cap C to the sides of said cap, in such a position as to leave only space for the toothed bar A between the said wheel and the middle part of the said cap, so that as the wheel C is turned in one or the other direction the toothed bar A may be moved forward or back. D is a lever, rigidly attached to or formed solidly upon one side of the wheel C. The lever D is curved in about the shape shown in Figs. 1 and 2, and has a hook, $d'$, formed upon it close to the wheel C.

E is a bar, having an eye or closed hook formed upon one end, by means of which it is pivoted to the lower end of one of the hames. The forward part of the bar E is slotted, so that it may pass over the cap B and lever D.

In using the fastener the toothed bar A, having the cap B connected with it, is pivoted to one of the hames, and the slotted bar E is pivoted to the other hame. Then, to fasten the hames, the slotted bar E is passed over the end of the cap B and over the outer end of the lever D, which has been brought into the position shown in Figs. 1 and 2. Then, by turning the end of the lever back the slotted bar E will slide down it toward the other end of the cap B, and at the same time the toothed bar A will be drawn inward by the action of the gear-wheel C, so that when the said parts reach the position shown in Fig. 1 the hames will be drawn tight and the fastener securely locked, the free end of the slotted bar E being drawn above the pivoting-points of the wheel C, so that any strain upon the fastener only tends to draw the hames tighter.

I claim as new and desire to secure by Letters Patent—

1. Drawing the hames together by means of a levered cog-wheel, D C, and toothed bar A, substantially as herein shown and described.

2. The combination of the toothed bar A, cap B, cog-wheel C, having a lever, D, formed upon or attached to it, and slotted bar E with each other, substantially as herein shown and described, and for the purpose set forth.

The above specification of my invention signed by me this 9th day of March, 1868.

W. H. PAYNE.

Witnesses:
F. M. HIBBARD,
BRADLEY M. BUCKLIN.